(12) United States Patent
Komatsu et al.

(10) Patent No.: US 6,324,686 B1
(45) Date of Patent: Nov. 27, 2001

(54) JUST IN TIME COMPILER TECHNIQUE

(75) Inventors: Hideaki Komatsu, Yokohama; Hiroyuki Momose, Tokyo-to; Kazunori Ogata, Fujisawa, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/188,943

(22) Filed: Nov. 10, 1998

(30) Foreign Application Priority Data

Nov. 11, 1997 (JP) .................................................. 9-308212

(51) Int. Cl.[7] .................................................. G06F 9/45
(52) U.S. Cl. .................................................. 717/5
(58) Field of Search .................. 717/6, 7, 8, 5, 717/9

(56) References Cited

U.S. PATENT DOCUMENTS

| | | | |
|---|---|---|---|
| 5,487,169 | * 1/1996 | Vraney et al. | 395/700 |
| 5,590,331 | * 12/1996 | Lewis et al. | 395/708 |
| 5,942,001 | * 8/1999 | Tanoue et al. | 714/752 |
| 6,078,744 | * 6/2000 | Wolczko et al. | 395/705 |
| 6,081,665 | * 6/2000 | Nilsen et al. | 395/705 |

OTHER PUBLICATIONS

IBM Technical Disclosure Bulletin "Threaded Code Interpreter for Object Code", vol. 28, No. 10, Mar., 1986.
Proebsting. Optimizing an ANSI C Interpreter with Superoperators. ACM. pp. 322–332, Jan. 1995.*
Romer et al. The structure and Performance of Interpreters. ACM. pp. 150–159, Oct. 1996.*

* cited by examiner

Primary Examiner—Mark R. Powell
Assistant Examiner—Wei Zhen
(74) Attorney, Agent, or Firm—Gregory M. Doudnikoff

(57) ABSTRACT

The present invention provides a compiler that can compile Java byte code at high speed while employing only limited resources. The technique converts byte code into intermediate code that employs, as an opcode, an address of an execution routine that corresponds to a byte code, and executes the execution routines in a sequential order corresponding to that of the intermediate code. The length of the intermediate code is constant and the bit location of the opcode is also constant. The execution routine is stored in sequential areas in a memory, and an offset of the execution routine group from the head address of the sequential memory area is employed as an opcode. Furthermore, by employing empty pipelines in the CPU, one part (operand generation and a jump) of an instruction group for jumping to the next intermediate code execution routine, and one part (prefetching of intermediate code and address calculation of a execution routine) of an instruction group for jumping to the next plus one intermediate execution routine can be executed in parallel to the original intermediate code process. Further, rule-based optimization using idioms is performed, without requiring analysis of the program structure.

18 Claims, 15 Drawing Sheets

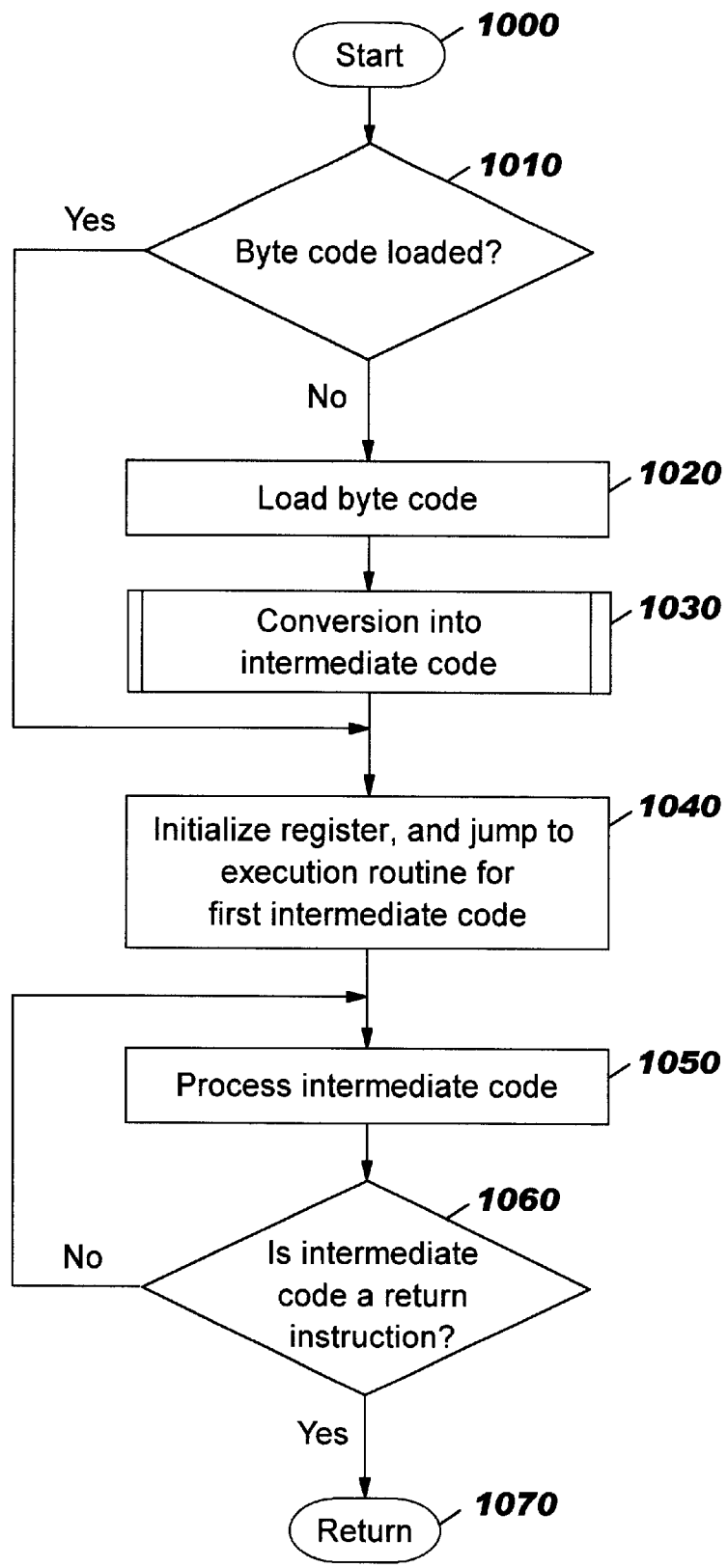

FIG. 19
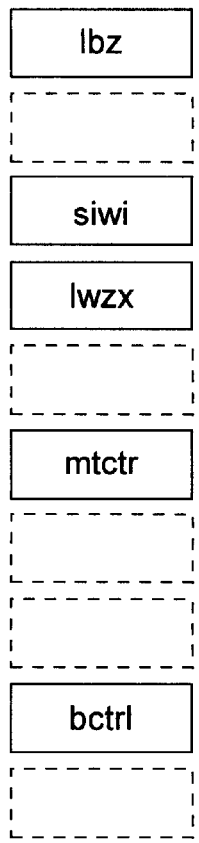
(a)
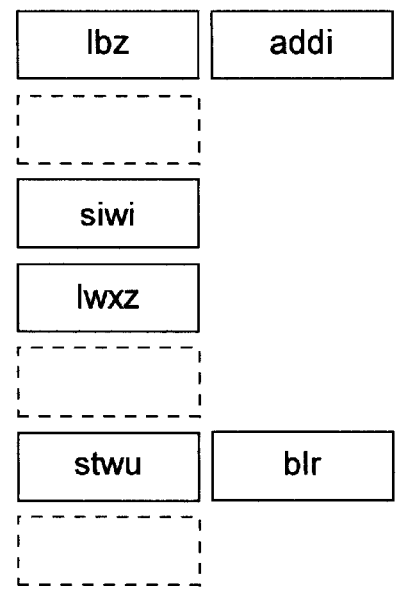
(b)
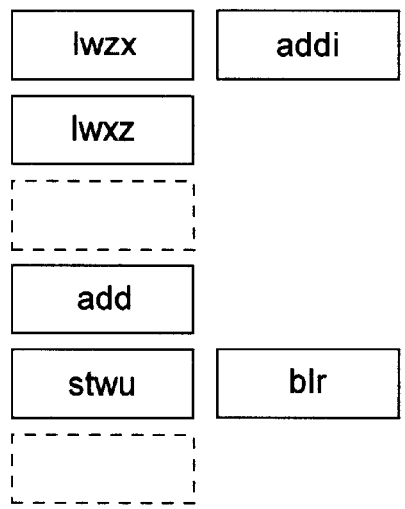
(c)
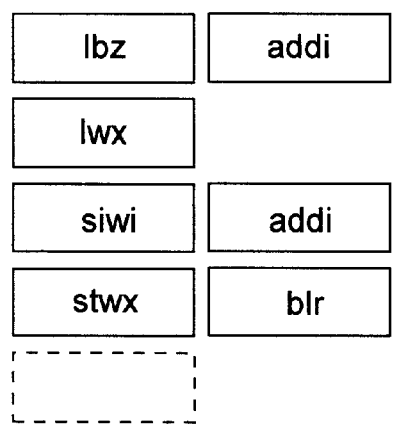
(d)

FIG. 20
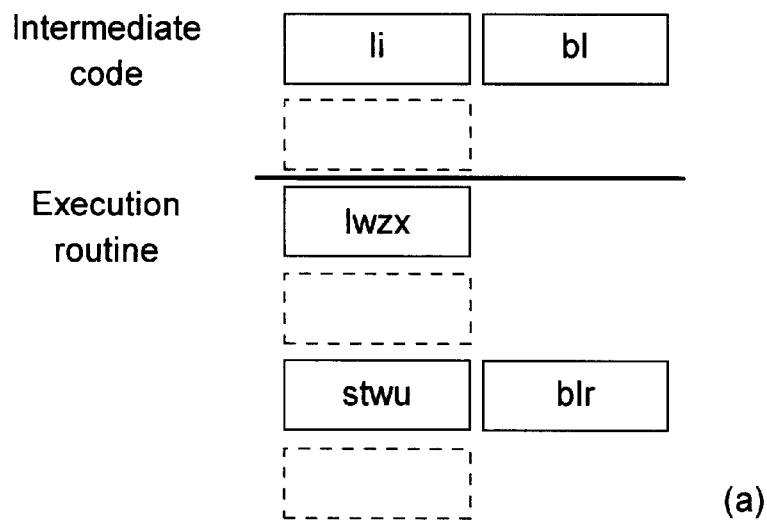
(a)
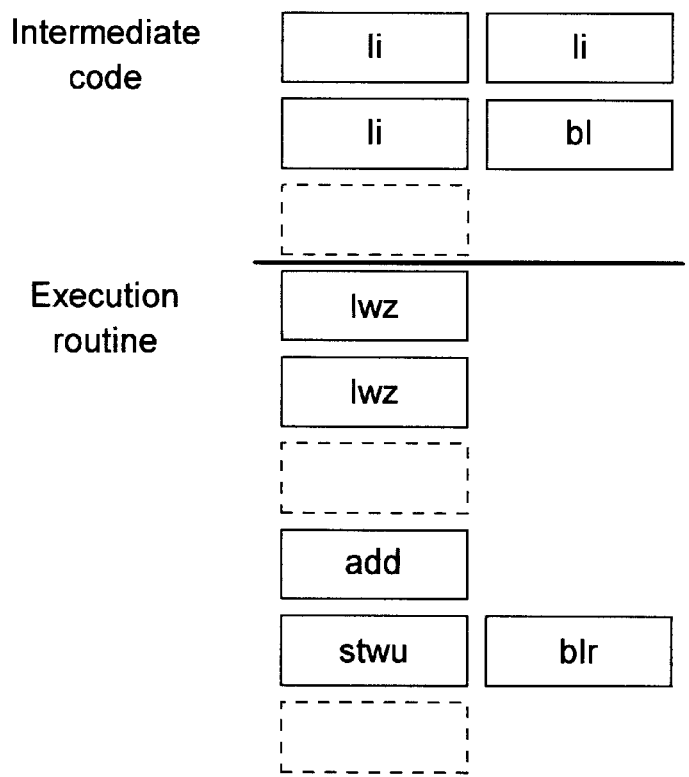
(b)

JUST IN TIME COMPILER TECHNIQUE

BACKGROUND OF THE INVENTION

1. Field of the Invention

The present invention relates to a compiler, and more particularly, to a Just In Time (JIT) compiler for Java (Java is a trademark of Sun Microsystems).

2. Description of the Related Art

The Java programming language has become ubiquitous over the last few years, due to the propagation of the Internet and its applicability to Internet programming. This is due to the characteristics of Java, especially the characteristics of Java byte code. As illustrated in FIG. 1, a server computer 1 compiles Java source code 10 into Java byte code 14. Java byte code, which can also be thought of as the executable code which comprises a Java program or application or applet, is not dependent on or tied to any specific operating system (OS) (such as Windows, OS/2 or Solaris) or computer platform (such as Intel, PowerPC, or RISC), thus the byte code 14 is not dependant on an OS 53 or hardware/CPU 55 in a client computer 5. (Windows is a trademark of Microsoft Corporation, OS/2 and Power PC are trademarks of IBM, and Solaris is a trademark of Sun Microsystems.) Thus, the byte code 14 can be executed by a variety of client computers connected to a network 3. The client computers can have a variety of hardware and OS configurations.

On the other hand, the Java byte code 14 must be interpreted at execution by the executing client computer. Interpreting code is a relatively slow process compared to executing compiled code (such as that found in C or C++ applications), and has proven to be a stumbling block in the acceptance of Java. The client computers may be workstations, personal computers, or network computers or similar devices, such as home-use information processors, that have small memory capacities or are not equipped with auxiliary storage devices, such as hard disks.

In the Java environment, Java byte code is executed by a client computer by a Java virtual machine which is present on the client computer. As illustrated in FIG. 1, the byte code 14 is provided to a Java virtual machine (Java VM) 52, which is provided for a WWW (World Wide Web) browser in the client computer 5. A Java interpreter 54 and a Java JIT compiler 56 are employed when the CPU (hardware 55) actually executes the byte code 14.

When executing the byte code 14, the interpreter 54 translates the byte code 14 and calls and executes an execution routine that is prepared for each instruction. Using an interpreter provides some advantages. First, execution of the byte code 14 can be initiated immediately, as soon as it is read. Second, as the amount of byte code involved is generally small, only a small memory capacity is required for the execution. A major disadvantage with the use of an interpreter is low execution speed. Low execution speed is the result of the following problems, which, arise because the byte code is decoded just before it is executed. First, since Java byte code is provided in a format having variable lengths, optimization by multiple prefetches is difficult for the CPU to perform. Second, rule-based optimization is difficult to provide for frequently detected byte code. When a complicated rule is employed or when many rules are employed, a relatively large amount of time is required to detect a byte code sequence for which the rule can be applied. Thus, rule-based optimization is not practical. Third, the reading of parameters can take place only at the head of the execution routine, and thus the processing can not be initiated immediately. Fourth, since a decoding loop exists, the processing time for the decoding loop is added to the processing time for the entire byte code 14. Therefore, the processing speed can not be enhanced so that it exceeds the decoding loop processing speed.

To obviate these shortcomings, a number of solutions have been attempted. One involves the use of a "just-in-time" compiler. As illustrated in FIG. 1, the JIT compiler 56 translates the byte code 14 into machine code in advance of or immediately before its execution, and executes it. The advantage of this method is that since the compiler technique is employed to optimize the machine code, the execution speed for the translated code is high. However, a conventional optimizing compiler requires more memory and greater CPU power than does an interpreter.

Another performance enhancement technique involves using threaded code. Using this technique, the byte code 14 is converted into a subroutine call, which is then executed. The threaded code is a pair of (1) a subroutine, which is prepared for each byte code to process the corresponding byte code, and (2) machine code, which sets a parameter and issues a subroutine call according to the byte code. The threaded code is obtained by compiling the byte code into machine code components, each of which has a minimum size. Executing the threaded code is faster than interpreting byte code and requires fewer resources than a conventional optimizing compiler. However, there are a number of drawbacks involved with using threaded code. First, to execute Java byte codes with, for example, a 32-bit RISC CPU, the average amount of memory occupied by converted parameter sets and call instructions is four times as large as that occupied by the original byte code. Second, before rule-based optimization can be applied for a frequently detected byte code sequence, the program structure must be analyzed to confirm that the byte code sequence does not extend over a plurality of basic blocks, because then the byte code sequence overhead may offset the effect of the optimization. Third, since intermediate code is also machine code, an execution routine that was previously executed may be expelled from an instruction cache.

However, no Java byte code compiler has been developed that can be incorporated in network computers and home-use information processors, and that can perform high-speed processing while requiring only a few resources.

SUMMARY OF THE INVENTION

One object of the present invention is to provide a compiler that can compile Java byte code at high speed while employing only limited resources.

Another object of the present invention is to provide a compiler that can perform rule-based optimization without having to analyze program structure.

An additional object of the present invention is to permit a rule to be applied, regardless of basic block boundaries of a program, in order to optimize the execution of the program.

A further object of the present invention is to provide an instruction configuration for an execution routine that corresponds to a byte code, that fully utilizes the capabilities of a CPU.

The first feature of the present invention is a method for converting a byte code into an intermediate code that employs, as opcode, an address of an execution routine that corresponds to a byte code, and for executing the execution routines in a sequential order corresponding to that of the intermediate code. The length of the intermediate code is made constant and the bit position of the opcode is also made constant. The execution routines are stored in sequential areas in a memory, and offsets of the execution routines from the head address are employed as opcodes. Therefore, the address generation of the execution routine corresponding to the intermediate code, and the operand generation can be performed at high speed. Furthermore, by employing empty pipelines in the CPU, one part (operand generation and a jump) of an instruction group for jumping to the next intermediate code execution routine, and one part (prefetching of the intermediate code and address calculation of an execution routine) of an instruction group for jumping to the next plus one intermediate code execution routine can be executed in parallel to the original intermediate code process. As a result, a saving can be realized in the time required for the decoding and jumping processes, and the execution speed can be increased. In addition, since the intermediate code is not an instruction but is data, the instruction cache can be used only for caching the execution routine group. Therefore, the instruction cache can be more efficiently used than in the background art that implements the intermediate code using the parameter set and a subroutine call to the execution routine.

The second feature of the present invention is the performance of rule-based optimization using idioms, without requiring analysis of the program structure. Specifically, when there is a byte code sequence A, B, C and D, and an idiom ABCD is defined, a byte code A is converted into an intermediate code abcd that employs an address of the ABCD execution routine as an opcode, and the byte codes B, C and D are converted into intermediate codes b, c and d that employ addresses of corresponding execution routines as opcodes. That is, the intermediate codes are generated in the order abcd, b, c and d. If the process jumps to a location following d when the execution of abcd has been completed, a case where there is a branch instruction jumping into the b, c or d can also be handled, and the same process can be ensured, while high speed processing can be provided. The intermediate code can not be reduced, but rule-based optimization using idioms can be provided without analyzing the program structure. Since conventionally the rule can not be applied when there is a branch instruction jumping into idiomized codes, this invention expands the applicable range of the rule.

As a summary of the above description, each of a plurality of execution routines, which are executed by a processor that can execute two or more instructions in one cycle, includes: instructions originally required for an execution routine; part of instructions for jumping to a second execution routine performed following the execution routine; and part of instructions for jumping to a third execution routine performed following the second execution routine. The two execution routines share a pre-process required for the execution of one execution routine, so that the instructions in one execution routine can be optimized smoothly, without incurring any penalties for jumps and decodings. This execution routine, as well as the other elements of the compiler, is stored in the main memory for the execution.

Each of the execution routines may correspond to each code in a code sequence that regulates the processing flow, and the part of instructions for jumping to the second execution routine may include an operand generation instruction for the second execution routine and a jump instruction for jumping to the second execution routine, while the part of instructions for jumping to the third execution routine may include an instruction for fetching a code corresponding to the third execution routine, and an instruction for calculating an address of the third execution routine.

Each of the execution routines may correspond to each code in a code sequence that regulates the processing flow, and an idiom execution routine, which is a set of a plurality of execution routines, may include an instruction for fetching a code corresponding to the second execution routine from a code sequence, an instruction for calculating an address of the second execution routine, an operand generation instruction for the second execution routine, an instruction for jumping to the second execution routine, an instruction for fetching a code corresponding to the third execution routine from a code sequence, and an instruction for calculating an address of the third execution routine. When the optimization using idioms is performed without analysis of the program structure, in the above described example, intermediate codes are generated in the order abcd, b, c and d. In the execution routine of the intermediate code before abcd, the pre-fetching of b and the address calculation for the b execution routine are performed; however, since the intermediate code to be processed after the abcd is an intermediate code that follows d and is not intermediate code b, so that pre-fetching and address calculation must be performed again. Therefore, the idiom execution routine requires the above described instructions.

In addition, when a second kind of data sequence (an intermediate code sequence) is generated from a first kind of data sequence (a byte code sequence), the following steps are performed: reading out a first kind of data; determining whether the first kind of read data sequence is identical to one of predetermined idiom data, each of which comprises a set of the first kind of data; and converting the first data in the first kind of read data sequence to a second kind of data corresponding to the idiom data, if the first kind of read data sequence is identical to the idiom data. In the above described example, this processing corresponds to conversion of the byte code A into the intermediate code abcd.

In addition, the following step may be further included: converting each data other than the first data in the first kind of read data sequence into the second kind of corresponding data. In the above described example, this step corresponds to the conversion of the byte codes B, C and D to corresponding intermediate codes b, c and d.

Furthermore, the following steps may be included: a second determination step of determining whether there is a probability that a data sequence other than the first data in the first kind of read data sequence is identical to a data sequence included in the predetermined idiom data; and a step of, if it is ascertained that there is no probability, converting data next to the first data into the second kind of corresponding data. In the above described example, an idiom BCD or BCDX (X is a byte code or byte codes of 1 or greater) is not present. However, generally the idiom BCD or BCDX may be predefined. The probability of the existence of such an idiom is judged, and if there is no probability of such an idiom existing, the following byte code is converted into a corresponding intermediate code.

Therefore, the following step may be further included: performing the second determination step for a data sequence in the first kind of read data sequence that is not yet converted into the second kind of data sequence. This is done because in the above example, an idiom may be predefined starting from C or D.

The above described process can be performed without a structure of the first kind of data sequence being analyzed before the determination step.

Further, the following steps may be further included: determining whether the data sequence in the first kind of read data sequence that is not yet converted into the second kind of data is identical to predetermined idiom data if it is ascertained that there is a probability; and if the data sequence is identical to the predetermined idiom data, converting the first data of the data sequence in the first kind of read data sequence into the second kind of data that corresponds to the predetermined idiom data that is determined to be identical, wherein the data sequence is not yet converted into the second kind of data. This is an example of the processing performed when the idiom BCD is predefined.

The step of converting to the second kind of data may include a step of calculating an address for an execution routine corresponding to the first kind of data. This calculation is necessary when an address of an execution routine is used as an opcode in the intermediate opcode.

The above processing can be performed by a dedicated device, or in accordance with a computer program. The execution routine and the computer program can be stored on a storage medium, such as a floppy disk, or a CD-ROM, or in a storage device, such as a main memory or a hard disk.

BRIEF DESCRIPTION OF THE DRAWINGS

FIG. 3 is a flowchart for a conversion/execution module;

FIG. 19 is a diagram showing an example process using the interpreter method; and FIG. 20 is a diagram showing an example process using the threaded code method.

DESCRIPTION OF THE PREFERRED EMBODIMENT

Figure 1:
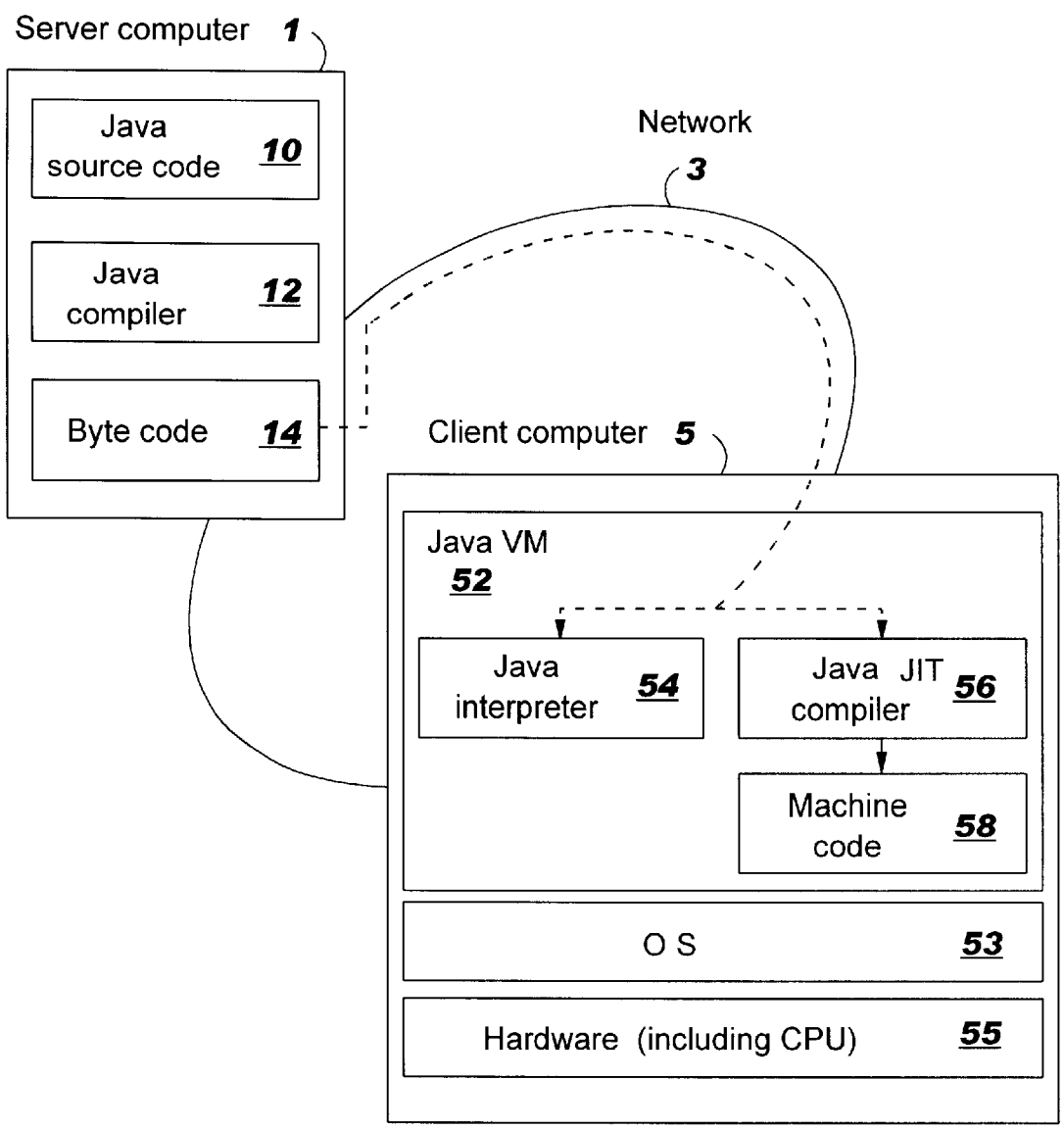
FIG. 1 is a block diagram illustrating a typical Java-computing environment.
Figure 2:
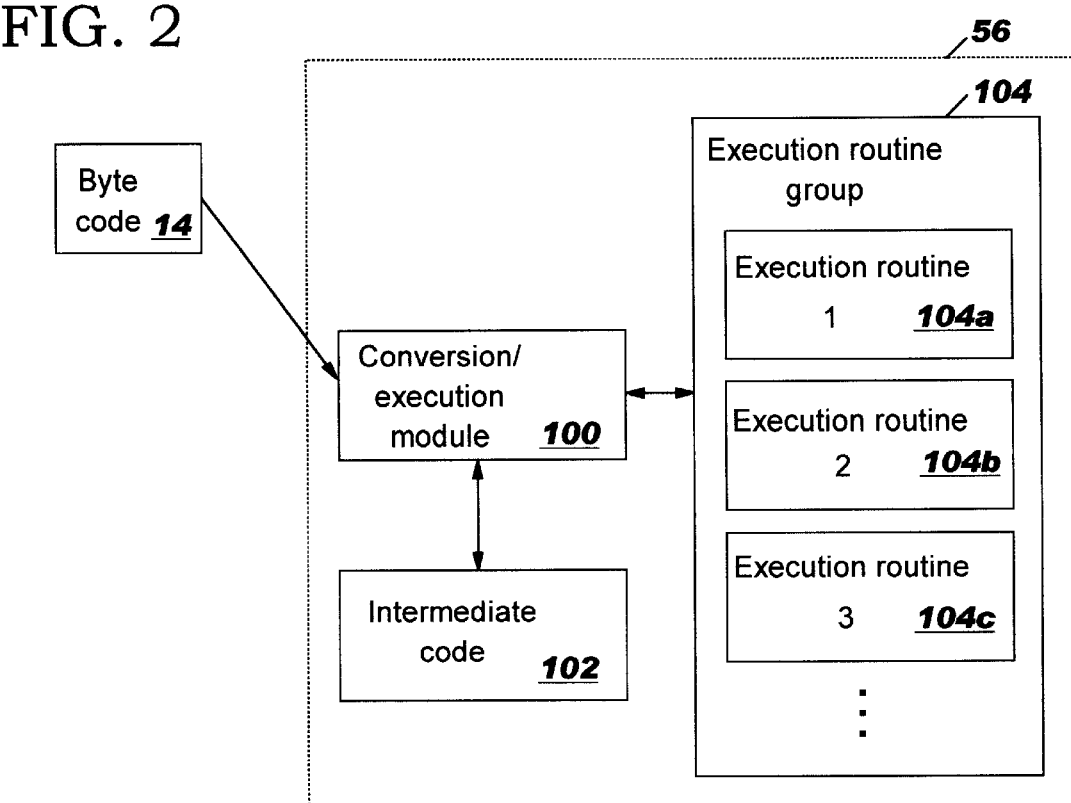
FIG. 2 is a block diagram showing a JIT compiler.

The general arrangement of a system which implements the present invention is the same as the system illustrated in FIG. 1. A JIT compiler 56, which is loaded into main memory of a client computer, is shown in a block diagram in FIG. 2. Java byte code 14 is received across a network 3 by a client computer 5, and is loaded into the main memory. An execution routine group 104 comprises individual execution routines which correspond to the individual segments of the byte code 14. The individual execution routines are sequentially stored in the main memory, and include an execution routine 1 (104a), an execution routine 2 (104b) and an execution routine 3 (104c), etc. As many execution routines as required may be provided. Further, a conversion/execution module 100 is provided that reads the byte code 14, generates intermediate code 102, and executes the code by referring to the execution routine group 104.

The processing performed by the conversion/execution module 100 will now be described referring to FIG. 3. When the conversion/execution module 100 is called, first, it determines whether the byte code 14 has been loaded (step 1010). If the byte code 14 has already been loaded, the conversion process for the byte code has been completed, and program control jumps to step 1040. When the byte code 14 has not yet been loaded, it is loaded (step 1020) and is converted into an intermediate code (step 1030). Once the byte code has been converted into the intermediate code 102, the byte code 14 is no longer necessary, and the area of the main memory in which the byte code 14 is stored is released. As a result, the memory can be effectively and efficiently employed. The conversion process includes a process for calculating, as an opcode for the intermediate code, an address of an execution routine that corresponds to each of the byte code segments.

When the conversion to the intermediate code is completed, the register of the CPU is initialized. Program control thereafter jumps to the execution routine for the first intermediate code segment (Step 1040), and the processing of the intermediate code segment is carried out (Step 1050). As long as the intermediate code segment is not a return instruction, the processing of the intermediate code is continued (Step 1060). When the intermediate code segment being processed is determined to be a return instruction in Step 1060, program control returns to a caller (step 1070).

Figure 4:
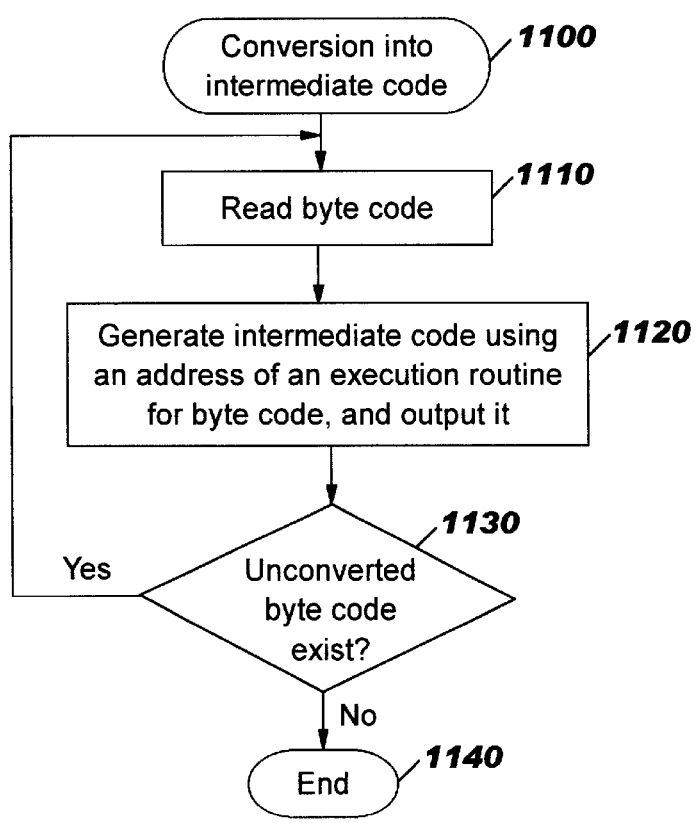
FIG. 4 is a flowchart for a conversion into intermediate code when rule-based optimization is not performed.
Figure 5:
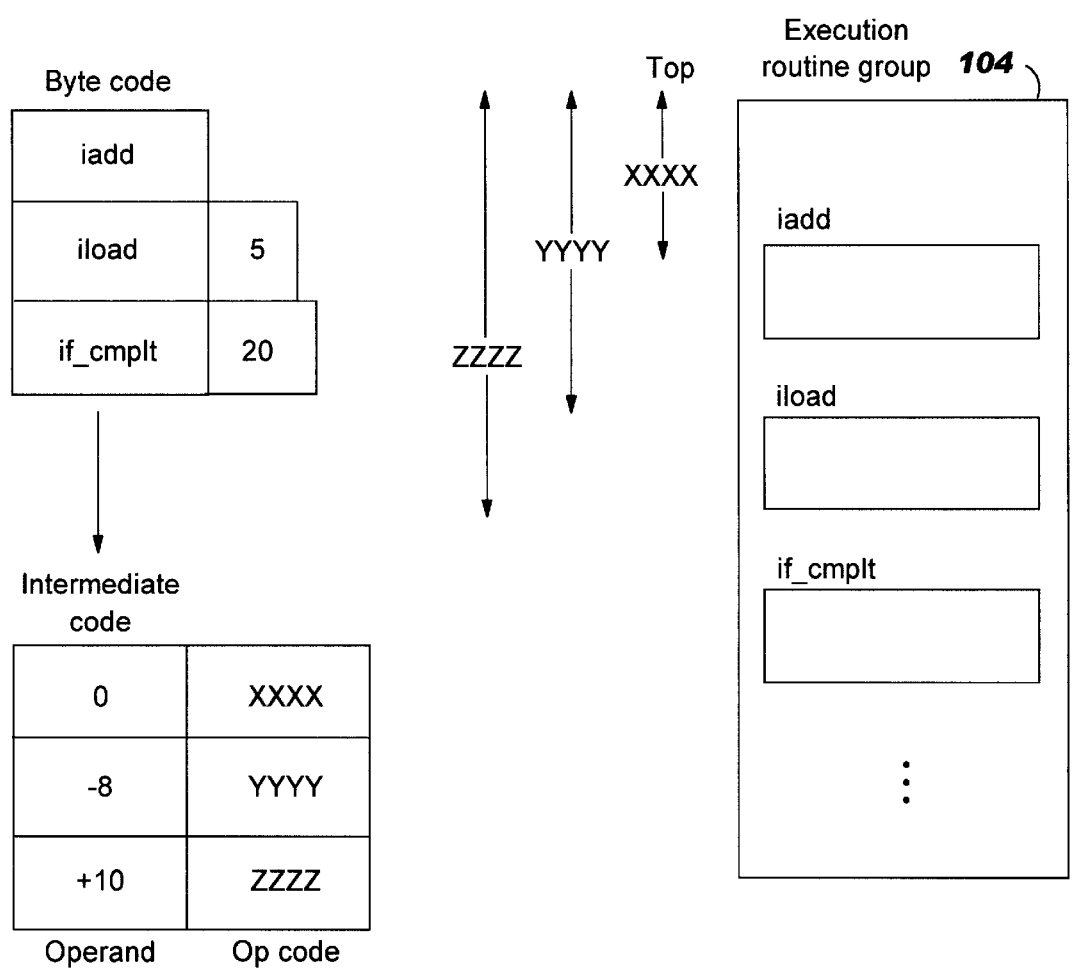
FIG. 5 is a diagram for explaining an opcode for an intermediate code segment.

FIG. 4 shows the process for converting the byte code 14 into the intermediate code 102. First, one byte code sequence is read (Step 1110), and an intermediate code segment is generated that has as an opcode an address of an execution routine from the group 104 that corresponds to the byte code sequence (Step 1120). Since the execution routines 104a, 104b, 104c, etc. are located in sequential areas in the memory, an offset from the address for the first execution routine 104a is determined to be the address for the corresponding execution routine. In the example in FIG. 5, since an execution routine corresponding to a byte code segment "iadd" is located at offset "xxxx" from the head (top) of the execution routine group 104, the first opcode for the corresponding intermediate code sequence is "xxxx". Further, since an execution routine corresponding to a byte code "iload" is located at offset "yyyy" from the head of the execution routine group 104, the next opcode of the intermediate code is "yyyy". Moreover, since an execution routine corresponding to a byte code "if_cmplt" is located at offset "zzzz" from the head of the execution routine group 104, the next opcode of the intermediate code is "zzzz". The execution routines need not be sequentially positioned, and so long as they are located, to a degree, close to each other, no speed penalty is incurred.

Since conventionally the byte code sequences have variable length and thus the use of a multiple-step pre-fetching process by the CPU is difficult, the length of the intermediate code segments should be constant, i.e., the binary code constituted by word units (e.g., 32 bits), the first word being constituted by an opcode and an operand. It is preferable that the locations and the lengths of the opcode and the operand in a word is also constant. In addition, it is also preferable that the opcode and the operand occupy positions within a single word, except when there are multiple operands required. If a second and succeeding words are required, the structure is predefined for each opcode. For an instruction requiring two operands, the first word may be constituted by an ordinary opcode and the first operand, and the second word may be constituted by the second operand and a NOP (No Operation) instruction. When an operand having a variable length is employed, the second and succeeding words must include operands having appropriate lengths.

Of the operands for the byte code, one is loaded in a stack, and one is included in the byte code. During the execution routine, the operand loaded in the stack is loaded from the stack, and the operand included in the byte code is extracted from the operand field of the intermediate code. The operands included in the intermediate code are classified as:

1. local variable index;
2. constant pool index;
3. constant value;
4. empty operand (operand only in stack) and
5. other operand consonant with an instruction.

The above individual operands will now be described.

1. Local Variable Index

In the Java byte code, local variables are numbered in ascending order, beginning with 0, and these number are used to designate a local variable to be employed as an operand. All the local variables have the same size (one word=32 bits), with two local variables being used for 64-bit data. For the intermediate code, instead of a local variable number, an offset (calculated in word-length units) from the head of a stack frame used for this method to the address of a local variable is used as an operand. When a specific method is executed by a JIT compiler, the area for a local variable is defined close to the stack frame for this method. The address for the head of the stack frame for the method in progress is held in the register (a BP register when a PowerPC, which will be described later, is used). Therefore, when the operands are defined as described above, the BP register and the offset, obtained by multiplying an offset by four and by converting the result into byte units in the preceding execution routine, are employed to enable an immediate access to the local variable (whether or not the operand should be multiplied by four in the preceding routine depends on the CPU).

2. Constant Pool Index

In Java, there are cases where operands having constant values are included in the byte code, and cases where constant values are stored in a constant pool (a constant table; the size of each element is one word=32 bits) and its index is used as an operand. When an operand is a constant value stored in the constant pool, the offset calculated in word units, which is obtained from the base address of the constant pool, is defined as an operand. In the execution routine, a register (a CP register in the following example), which holds the base address of the constant pool, and the offset, obtained by multiplying an offset by four and by converting the result into byte units in the preceding routine, are employed to immediately load the contents of the constant pool. In the actual implementation, the base address of the constant pool is defined as the head address of the constant pool+32 K words. With this definition, when the operand of a 16-bit signed value is used as an index, a maximum 64 K entries can be accessed.

3. Constant Value

When a constant value is included in the byte code and when an instruction handling an integer is issued, the constant value falls within the range of a 16-bit signed integer. In this case, the integer is used as an operand. For an instruction handling a floating-point value, the constant value is either 0, 1 or 2. Bits other than the upper 16 bits are 0s, regardless of a single-precision floating-point value or a multiple-precision floating-point value. Therefore, the upper 16 bits of the constant value which is represented by a format according to the instruction is defined as an operand. When an instruction handling an integer value employs an operand, since the operand is multiplied by four in the preceding execution routine, the operand must be multiplied by 1/4 to return to the original value. Although these processes are wasteful, in the byte code of the actual program there are more instructions for accessing local variables and the constant pool than instructions for handling constant values, and the system is so designed that the speeds for the processes that are required more often are higher. Since an instruction for handling a constant value is a simple instruction merely for pushing the constant value onto the stack, the 1/4 multiplication process does not adversely effect the execution speed because of the dependency existing between instructions. For the instructions that handle floating-point values, a required bit of 0 is added.

4. No Operand

When there is no operand in the byte code, such as an iadd instruction (for calculating the sum of two integer values on the stack and pushing the sum onto the stack), an appropriate value ("0" in the actual implementation) is entered.

5. Other Operand Consonant with An Instruction

A value that can be expressed using 16 bits that represents an operand for each instruction and with which the speed for the execution can be increased. For an operand that exceeds 16 bits, two or more words are used for the intermediate code segment.

When, for the process at Step 1120 in FIG. 4, a table for the byte code sequences and corresponding offsets is provided, the processing speed can be increased. The processes at Steps 1110 and 1120 are repeated until conversion of all the byte code sequences is completed (Step 1130).

In this embodiment, the execution routine is executed by a CPU that can execute two or more machine code segments during one cycle (one clock). Each of the execution routines includes machine code for processing the byte code sequence, for address calculation of an execution routine for the next byte code sequence and for operand generation, for loading the next plus one intermediate code segment and address calculation for the execution routine, and for jumping to the execution routine for the next byte code sequence. An example where a PowerPC 603e is used as the CPU is shown (PowerPC is a trademark of IBM Corp.).

Figure 6:
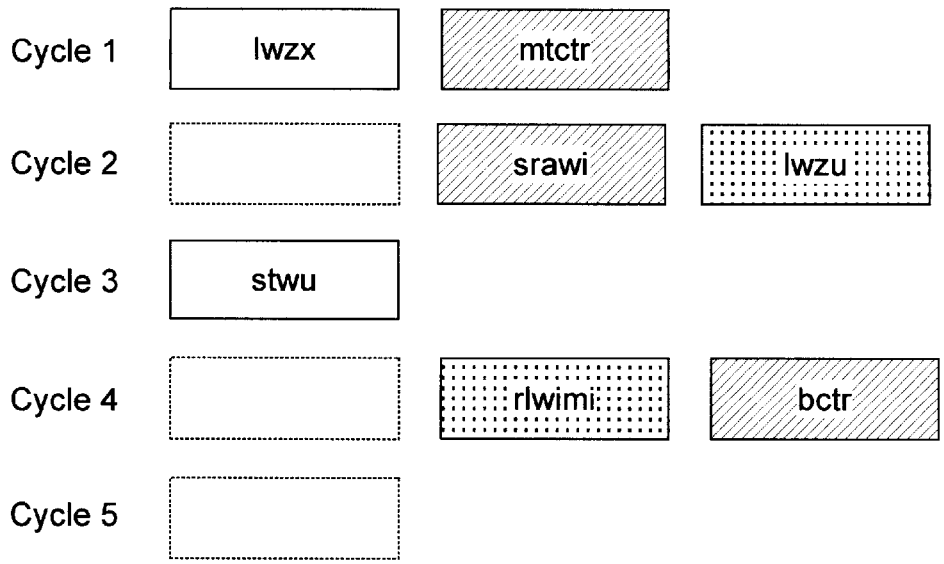
FIG. 6 is a diagram showing an example execution routine for "iload"
Figure 7:
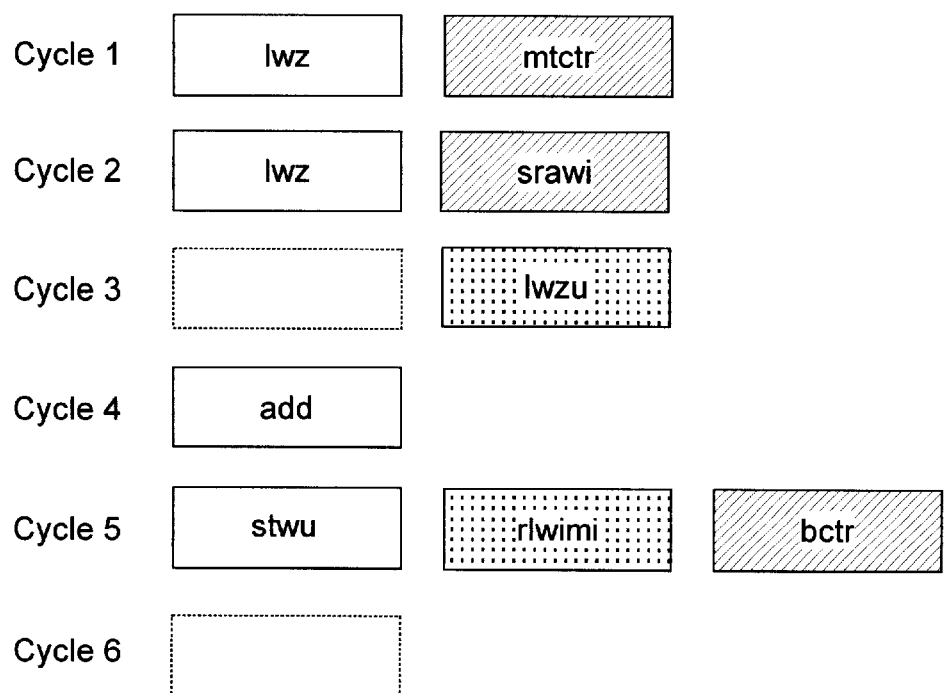
FIG. 7 is a diagram showing an example execution routine for "iadd"
Figure 8:
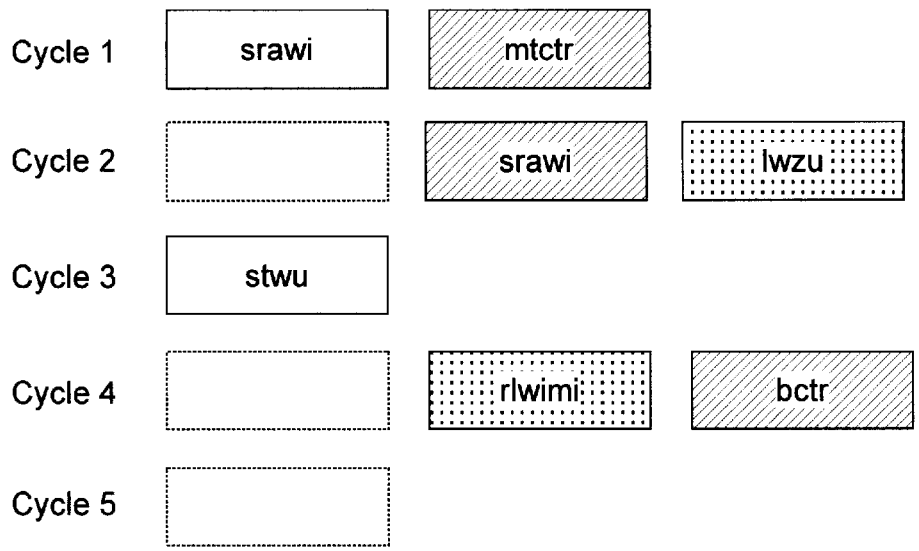
FIG. 8 is a diagram showing an example execution routine for "iconst"

The PowerPC 603e can execute a maximum of five instructions in one cycle (it should be noted that the PowerPC 603e can execute reading two instructions in one cycle, but when the reading instructions have been completed, it can execute five instructions in one cycle). With this capability, overhead due to the pre-processing for executing the intermediate code can be hidden. FIGS. 6 to 8 show instructions which can be executed in one cycle (by one line). For example, in the execution routine for a byte code sequence "iload", which is an instruction to push a local variable onto an operand stack, as shown in FIG. 6, the processing (shaded portion) for the next intermediate code segment and the processing (hatched portion in the center column and the right column) for the next plus one intermediate code segment are performed, while the original processing (in the left column) of the "iload" instruction is executed. The portions enclosed by the broken lines represent steps where there are no instructions to be executed in the CPU pipeline, because of stalling the original intermediate code process or the dependency between instructions in the original processing of the intermediate code.

The instruction "lwzx" is an instruction for loading a value from a local variable, and "stwu" is an instruction for pushing it onto the operand stack. These two instructions are required for the byte code "iload" processing. The instruction "mtctr" is an instruction for setting the address of the next execution routine in a counter; "srawi" is an instruction for multiplying the operand by four; and "bctr" is an instruction for jumping to the next execution routine. These instructions constitute a portion of those required for a jump to the next execution routine. In addition, "lwzu" is an instruction for pre-fetching the next plus one intermediate code, and "rlwimi" is an instruction for calculating the address of the next plus one execution routine. These instructions constitute a portion of those required for a jump to the next plus one execution routine.

FIG. 7 shows instructions that are required for an instruction "iadd" for popping two sets of data from the operand stack and for pushing the sum of the data values onto the operand stack. As is apparent from FIG. 7, a portion of the instructions required for a jump to the next execution routine and part of the instructions required for a jump to the next plus one execution routine are the same as those of "iload". Further, the instructions required for "iadd" are "lwz" (the loading of data 1) , "lwz" (the loading of data 2), "add" (calculation performed using data 1 and data 2) and "stwu" (the pushing of the result onto the operand stack).

FIG. 8 shows instructions that are required for a byte code sequence "iconst", which is an instruction for pushing a constant value provided by the operand onto the operand stack. As apparent from FIG. 8, part of the instructions required for a jump to the next execution routine and part of instructions required for a jump to the next plus one execution routine are the same as those of "iload" (FIG. 6). Further, the instructions required for "iconst" include the instruction "srawi" for calculating the constant value (a signed value) and the instruction "stwu" for pushing the constant value onto the operand stack.

Assuming that reserved registers are named as follows, the details of the execution routines corresponding to "iload 4", "iadd" and "iconst 4" are as shown below.

pc: intermediate code address
ea: address for execution routine of next intermediate code
op: operand for the next intermediate code ×4
now: next plus one intermediate code
bp: head of a stack frame
sp: head of an operand stack
cp: base address in constant pool "iload 4"
cycle # 1
mtctr ea
lwzx r3,bp,op
cycle # 2
srawi op,now,14
lwzu now,4(pc)
cycle # 3
stwu r3,-4(sp)
cycle # 4
rlwimi ea,now,2,16,29
bctr
cycle # 5
pipeline stall
"iadd"
cycle # 1
mtctr ea
lwz r3,4(sp)
cycle # 2
lwz r4,0(sp)
srawi op,now,14
cycle # 3
lwzu now,4(pc)
cycle # 4
add r3,r3,r4
cycle # 5
stwu r3,4(sp)
rlwimi ea,now,2,16,29
bctr
cycle # 6
pipeline stall
"iconst 4"
cycle # 1
mtctr ea
srawi r3,op,2
cycle # 2
srawi op,now,14
lwzu now,4(pc)
cycle # 3
stwu r3,-4(sp)
cycle # 4
rlwimi ea,now,2,16,29
bctr
cycle # 5
pipeline stall The definitions for the above individual instructions will be described below.

lwz: Read one word (four bytes) from memory and load into a register.
lwzu: Read one word from memory and load into a register, and store a data address in a register used for the designation of an address.
lwzx: Read one word from memory and load into a register. Designate an address by using the sum of two register values.
lbz: Read one byte from memory and load into a register.
stwu: Write one word from a register to memory, and store a data address in a register used for the designation of an address.
stwx: Write one word from a register to memory. Designate an address by using the sum of two register values.
li: Set a constant value in a register.
add: Add two register values.
addi: Add a constant value to a register value.
srawi: Shift to the right the contents of a register while extending them using a sign.
slwi: Shift to the left the contents of a register.
rlwimi: Rotate the contents of register A, and replace a bit sequence of register B with a corresponding part of the resultant bit sequence.
mtctr: Set a value in a counter register (a register for storing an address for an indirect jump).
bctr: Jump to an address stored in a counter register.
blr: Jump to an address stored in a link register (a register for holding a return address).

bctrl: Hold a return address in a link register, and jump to an address stored in a counter register.

Figures 9, 10:
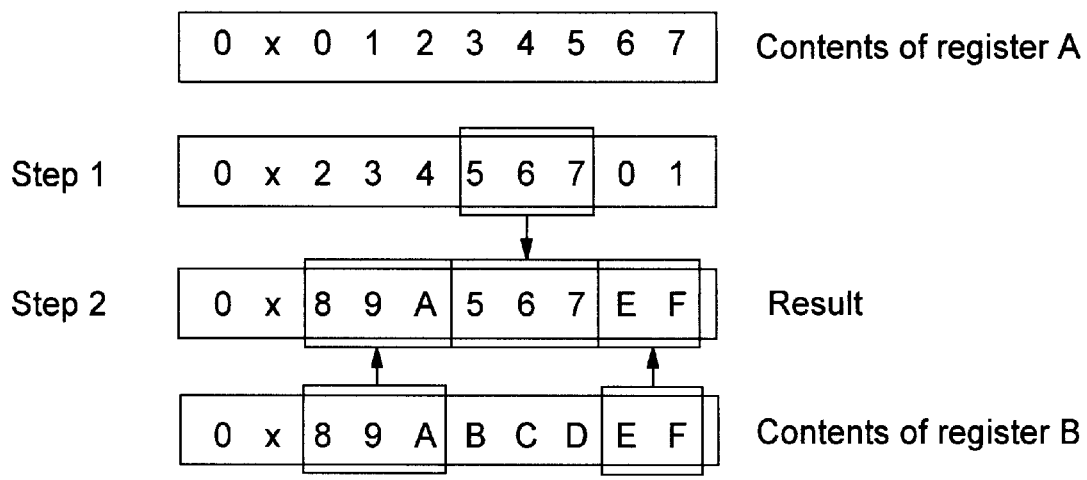
FIG. 9 is a diagram illustrating the "rlwimi" instruction.
FIG. 10 is a diagram which illustrates a second feature of the present invention.

An instruction "rlwimi", which is used for the calculation of an address for the next execution routine, will now be explained referring to FIG. 9. When "rlwimi B, A, 8, 12, 23" and registers A and B are as shown in FIG. 9, first, the contents of register A are rotated to the left 8 bits. Then, the 12 bits which comprise bit 12 to bit 23 (5, 6, 7 in this case) of the register A take the place of bits at corresponding locations in register B. As a result, the contents of register B are as shown at step 2. The "0x" at the beginning of registers A and B represents a hexadecimal system, and are not subject to the 8 bit rotation in Register A.

With the above arrangement, the processing speed can be as high as or higher than when the compiling process is performed by a conventional compiler, which does not perform high-level optimization, such as register allocation or code scheduling. In addition, since the head address of the execution routine group is used as the opcode, the intermediate code can be reduced to twice the byte code. It should be noted that since the byte code is discarded after it is translated into the intermediate code, the amount of memory used can be reduced.

The second feature of the present invention will now be described. In the second feature, there is no limitation placed on the CPU to be employed. Specifically, while in the above description the CPU should execute a plurality of instructions during one cycle, the second feature of the present invention does not rely on the CPU. It should be noted, however, that if higher speed processing is required, a combination of the second feature and the above described feature can be employed.

FIG. 10 shows the outline of the second feature. The left side of the "Original byte code" column in FIG. 10 represents an opcode, while the right side represents an operand. The "Rule LLAS applied" and "Rule LAS additionally applied" columns are for intermediate code, and their left sides represent opcodes, while their right sides represent operands. The opcodes are addresses, and in this case, the same name is employed for the opcodes as is employed for the byte code or the rule name.

Suppose that rule or idiom LLAS, which comprises a byte code sequence of "iload", "iload", "iadd" and "istore", is predefined. Since the byte code sequence on the left side in FIG. 10 match the defination of the rule LLAS, the rule LLAS is employed to generate intermediate code. The generated intermediate code is entered in the "Rule LLAS applied" column.

It should be noted that when a rule is applied in the prior art, all the code sequences included in the definition of the rule are replaced by the pertinent rule. That is, in the example in FIG. 10, byte code components "iload", "iload", "iadd" and "istore" would be replaced by "LLAS" in the prior art, and the intermediate code segment "iload", for which the rule does not apply, would follow it. However, in the present invention, only the first byte code component included in the rule definition is converted into "LLAS", and the remaining byte code components "iload", "iadd" and "istore" are converted into intermediate code segments. As a result, the application of the rule is possible without performing an analysis of the program structure. That is, even when some codes jump into the second code "iload" in the "Original byte code" (indicated by an arrow), since "iload", "iadd" and "istore" remain in the intermediate code, a theoretically correct process can be performed (in the LLAS execution routine are required a process for reading operands of "iload" and "istore" and a process for jumping to the last "iload"). It is impossible with the prior art for the rule using the idiom to be applied to such a portion. In other words, conventionally it has been confirmed by the analysis of a program structure that the application of the rule using the idiom is impossible for such a portion.

According to the present invention, when one rule LAS (which comprises the byte code sequence of "iload", "iadd" and "istore") is defined, it is added as shown in the "Rule LAS additionally applied" column on the right in FIG. 10. Also in this case, from among the byte code components "iload", "iadd" and "istore" that comprise LAS, only the first code component "iload" is converted into "LAS", and the remaining components "iadd" and "istore" are converted into intermediate code. The "LAS" execution routine also requires a process for reading an operand of "istore" and for jumping to the last "iload." In the example in FIG. 10, the rules LLAS and LAS are defined and can be applied; however, when rules LLAS and AS ("iadd", "istore"), or rules LLAS and SL ("istore", "iload"), are defined, they can be applied.

The application of the idiom is performed at a process for converting byte code sequences into intermediate code segments (Step 1030 in FIG. 3). This process is shown in detail in FIG. 11. First, a byte code sequence is read to determine whether it matches a rule (Step 1210). In most cases, this process is performed using a state transition, which will be briefly described later. It is determined whether the read byte code sequence matches the rule (Step 1220). If the byte code sequence matches the rule, an intermediate code segment is generated using the address of the execution routine for the matched rule and is output (step 1230). For this process, a table for addresses and corresponding rules can be employed. It should be noted that an intermediate code segment is generated only for the first byte code component of the byte code sequence, and the other byte code components remain unchanged. When the read byte code sequence does not match the rule, for the first byte code component that has been read but for which an intermediate code has not yet been generated, an intermediate code segment is generated using the address of the execution routine and is output (Step 1240). This process is performed because when the byte code sequence does not match, the first byte code component is converted into the intermediate code in order to search for the rule that employs the next byte code component as the first code component in a sequence.

Following this, it is checked whether there is a byte code component that has been read but for which the intermediate code has not been generated (Step 1250). When there is such a byte code component, or when the process at Step 1230 has been performed, it is checked whether the byte code sequence that is read but for which the intermediate code has not been generated matches all or the first portion of a specific rule (Step 1260). If the byte code sequence does not match any rule, program control returns to Step 1240. When the byte code sequence matches a specific rule or probably matches the rule, a search for the next rule is prepared (Step 1290). When the intermediate code has been generated for all the byte code that has been read, the rule search process is reset (Step 1270). The above process is repeated until there is no byte code that has not yet been translated (Step 1280). The individual processes at Step 1220 and the following steps are performed for each one byte code.

An example of the process carried out by Step 1210 in FIG. 11 will now be described while referring to FIG. 12. First, it is checked whether there is a byte code component that has not yet been converted (Step 1410). If there is such a byte code, a succeeding byte code is read (Step 1420). The succeeding byte code is used to obtain a state to be shifted (Step 1430). It is checked whether the acquired state does not match any rule (Step 1440). If it does not, the processing is thereafter terminated (Step 1520). If there is a possibility that a rule is matched, the current state is shifted to the acquired state (Step 1450), and a pointer indicating a byte code to be read next is advanced by one (Step 1460). Then, it is checked whether the current state has matched the rule (Step 1470). If the state does not match the rule, program control returns to Step 1410. If the state has matched the rule, the byte code is considered to have successfully matched the rule and the processing relative to Step 1210 is terminated (Step 1510).

When, at Step 1410, there is no unconverted byte code determined to be present, the state is shifted to a state where there is no more byte code to be read, and is acquired (Step 1480). Then, it is checked whether the current state matches the rule (Step 1490). If the state matches the rule, the state is changed to the acquired state (Step 1500), and processing is thereafter terminated (Step 1510). If the state is determined not to match the rule in Step 1490, processing is terminated (Step 1520). Since the algorithm using the state transition to determine whether the state matches the rule is the same as the algorithm using the state transition to search for a character sequence, "Introduction to Algorithms," The MIT Press, McGraw-Hill Book Company, 1991, pp. 855 to 868, should be referred to.

Figure 11:
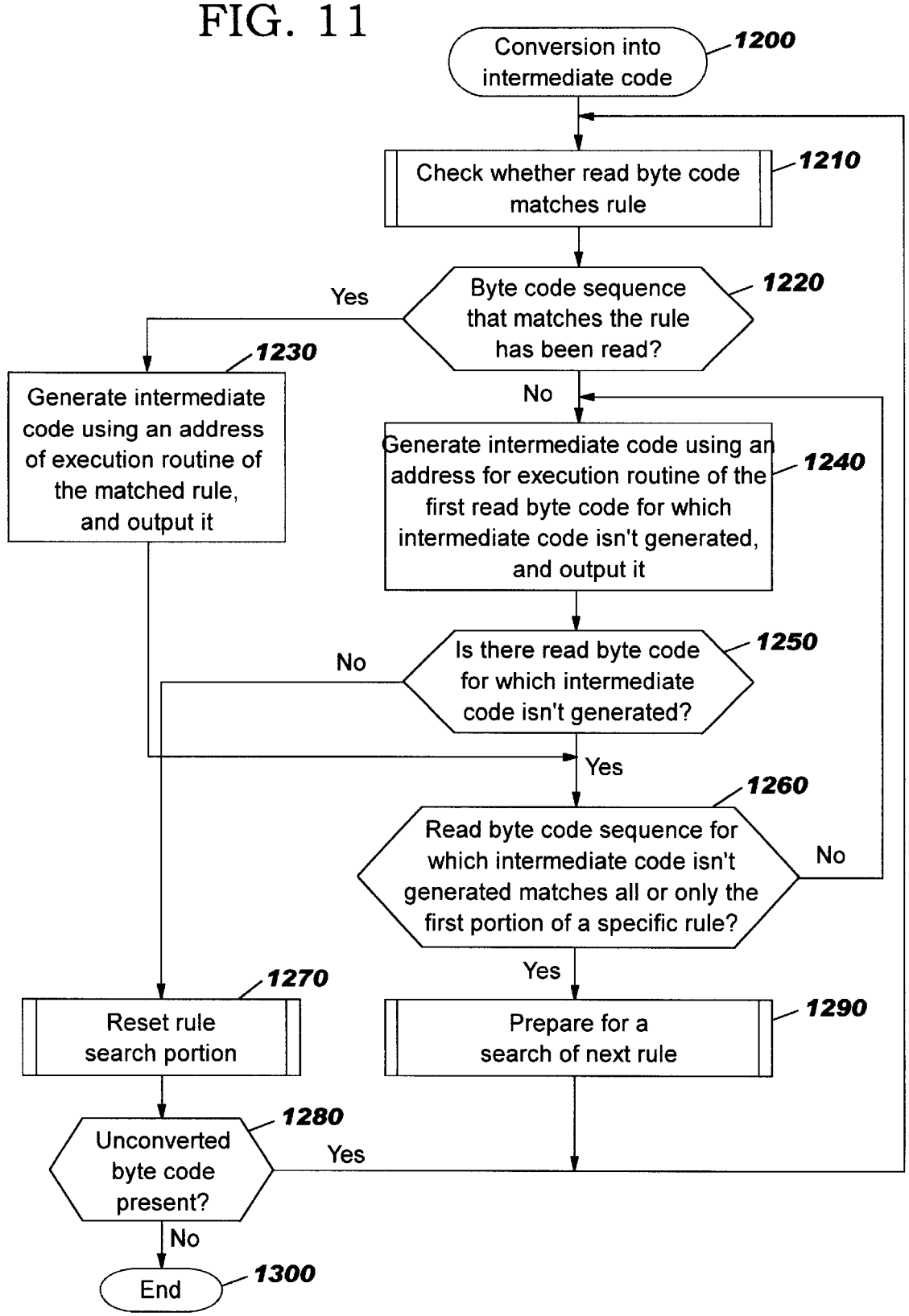
FIG. 11 is a flowchart for rule-based optimization processing according to the present invention.
Figure 12:
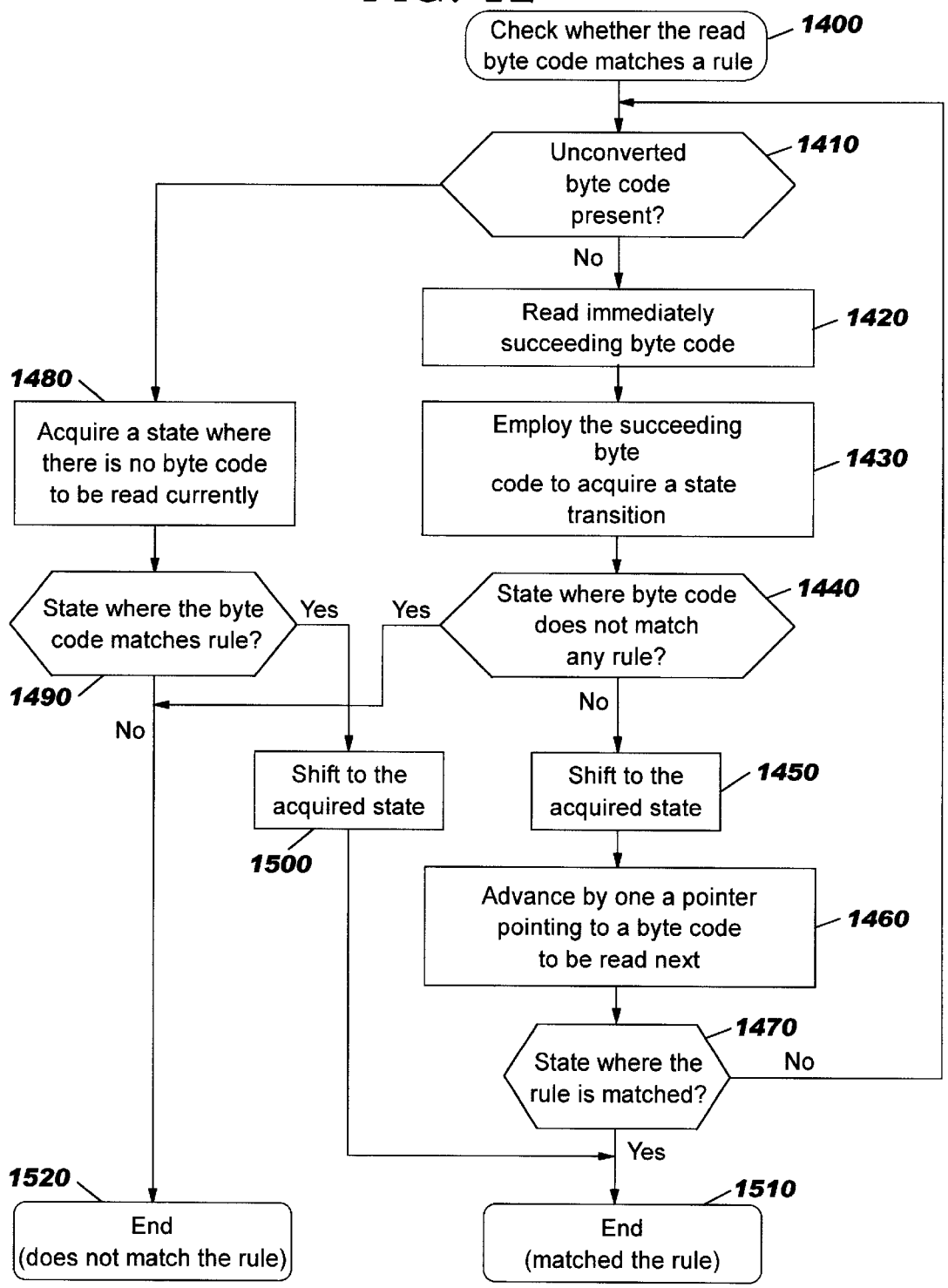
FIG. 12 is a flowchart for determining whether a read byte code sequence matches a rule.
Figure 13:
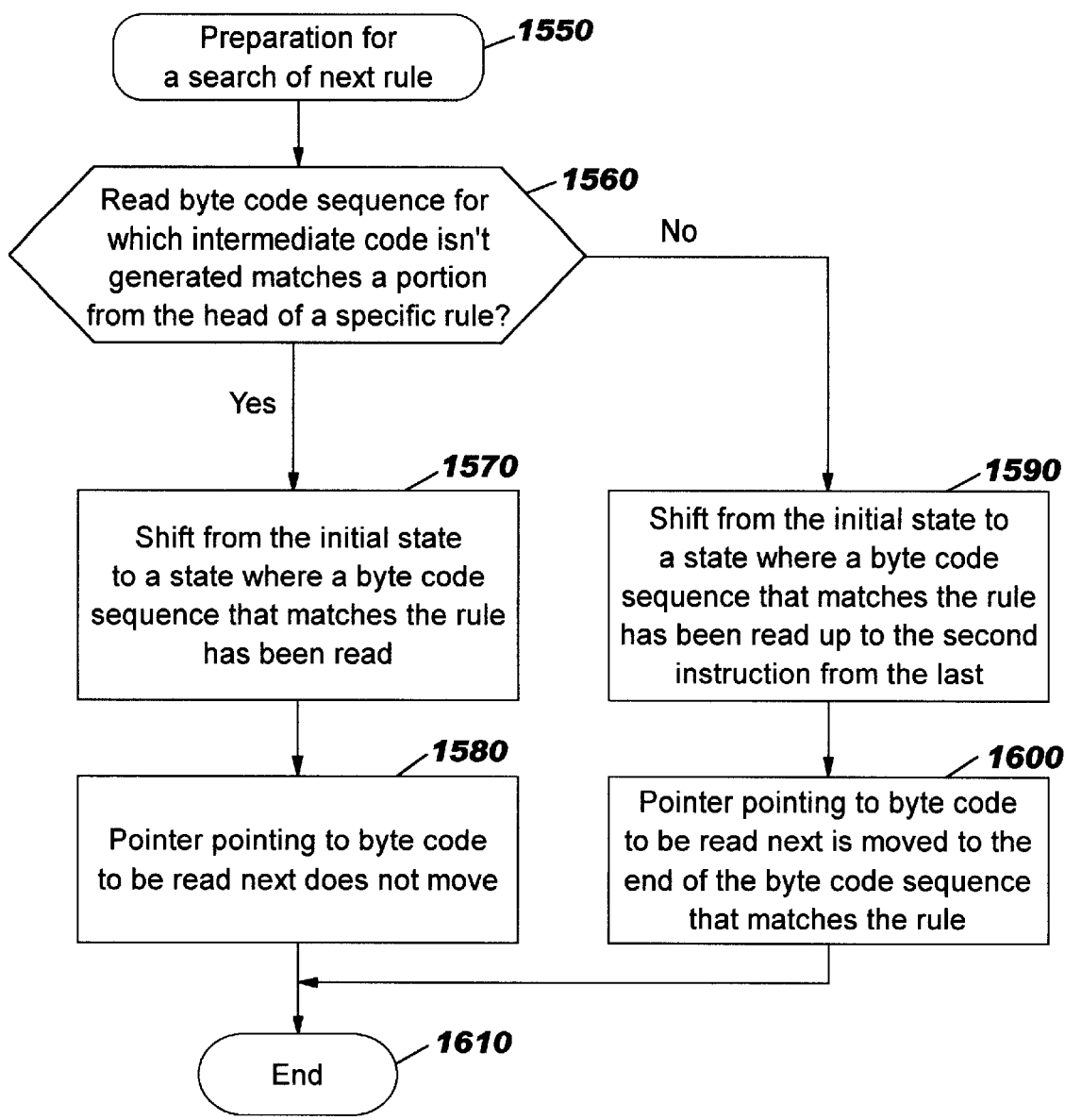
FIG. 13 is a flowchart showing preparation of a search for the next rule.

An example of the process carried out by Step 1290 in FIG. 11 is shown in FIG. 13. First, it is checked whether a byte code sequence that has been read but for which intermediate code has not yet been generated matches a portion from the first of a specific rule (Step 1560). Reversely, it is checked whether the entire byte code sequence that has been read but for which intermediate code has not been generated does not match the rule. If the entire byte code sequence matches the rule (the direct answer of the Step 1560 is No shown in FIG. 11.), the initial state is shifted to a state where the byte code sequence that matches the rule has been read up to the second from the last instruction (Step 1590). That is, the processing is returned to the preceding byte code of the last byte code that was read. Then, a pointer that indicates the byte code to be read next is moved to the end of the byte code sequence that matches the rule (Step 1600) in order to read it and repeat the processing in FIG. 12.

If the byte code sequence that is read but for which the intermediate code has not yet been generated is the first portion of the rule, the initial state is changed to a state where the byte code sequence that matches the rule has been read (Step 1570). A pointer that indicates the byte code to be read next is not moved (Step 1580) because the byte code to be read next has already been prepared.

Figure 14:
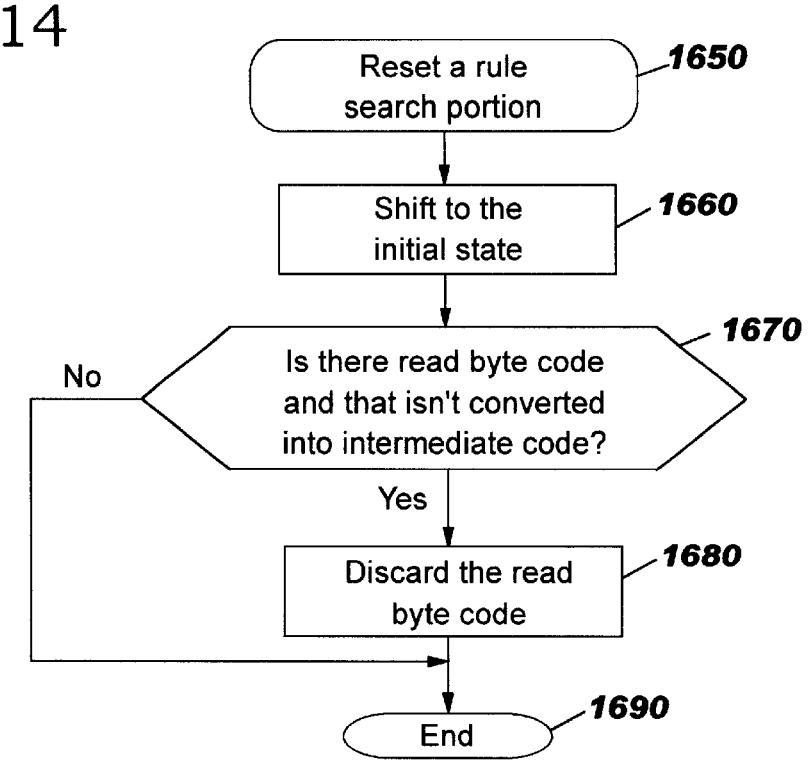
FIG. 14 is a flowchart illustrating the processing of resetting a rule search portion.

An example process at Step 1270 in FIG. 11 is shown in FIG. 14. To reset the rule search portion, the state is returned to the initial state (Step 1660), and it is checked whether there is a byte code that has been read and that has not yet been converted into intermediate code (Step 1670). Generally, if the process reaches Step 1270 in FIG. 11, there is no byte code that has not been converted into intermediate code, even though it has been read. When there is no unconverted byte code, the processing is thereafter terminated (Step 1690). If there is unconverted byte code, the byte code that has been read is discarded (Step 1680).

Figure 17:
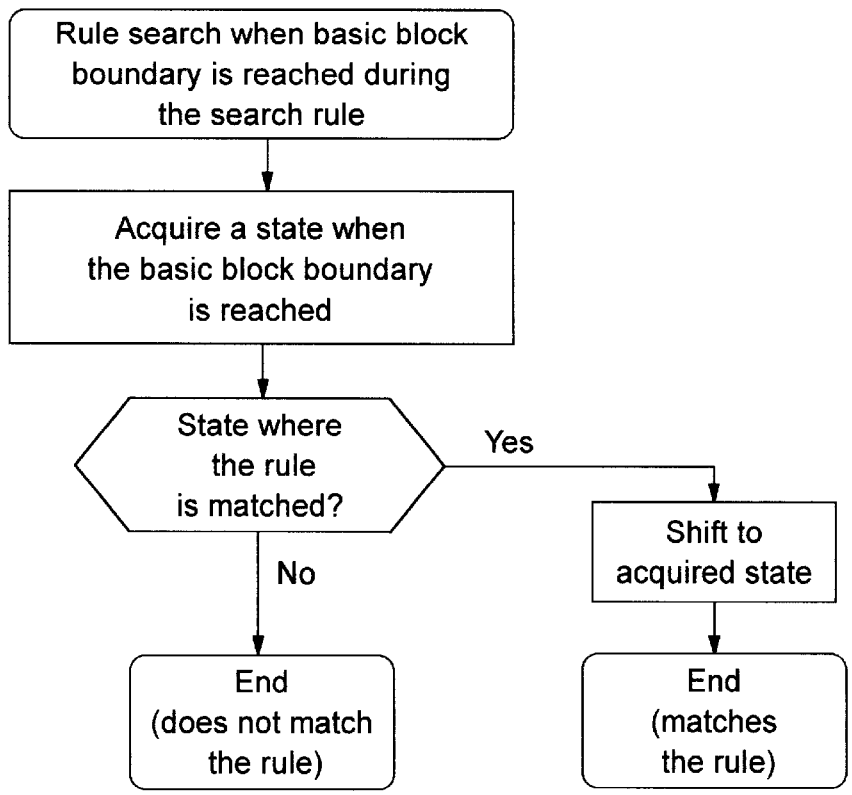
FIG. 17 is a flowchart for a rule search process when the basic block boundaries is reached during the rule search illustrated in the flowchart of FIG. 15.
Figure 15:
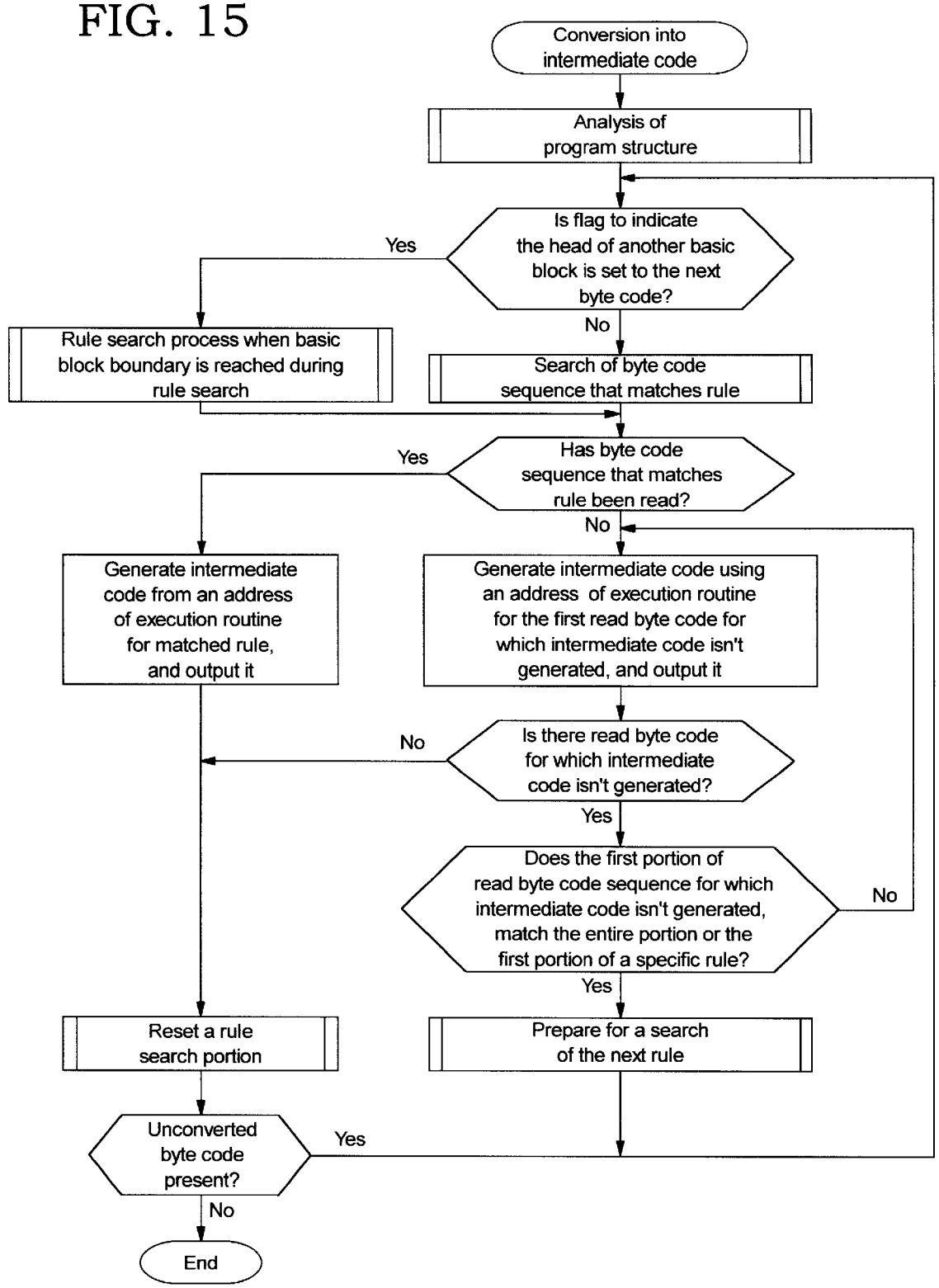
FIG. 15 is a flowchart illustrating a conventional process of a conversion into intermediate code.
Figure 16:
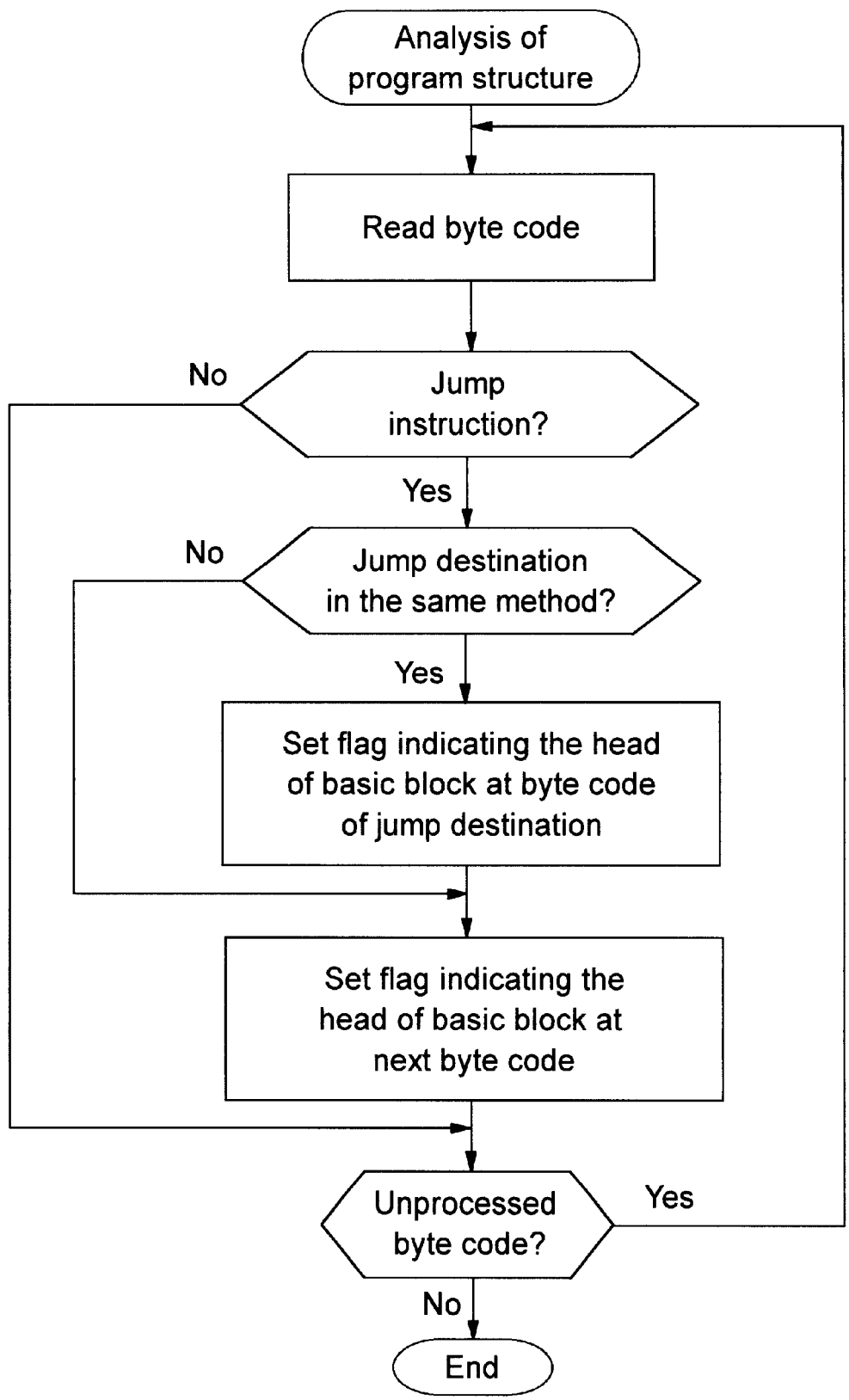
FIG. 16 is a flowchart illustrating a program structure analysis process in FIG. 15.

Conventional processing is shown in FIG. 15 for comparison. Though no detailed explanation for it will be given, the analysis of a program structure (see FIG. 16) must be performed first. A check is then performed to determine whether a byte code sequence matches the rule, while taking into account the basic block boundaries. The process for generating and outputting the intermediate code using an address of an execution routine that matches the rule is performed in the same manner as when the byte code sequence that matches the rule has been read. In this case, all the byte codes included in the definition of the rule are replaced with the rule, and the rule search portion is thereafter reset (the same as in FIG. 14). Therefore, the structure of the generated intermediate code differs between the present invention and the background art. The rule search process in FIG. 15 when the basic block boundaries is reached during the search for the rule is shown in FIG. 17.

As described in the first portion for explaining the second feature of the present invention, no particular limitation is placed on a CPU for the implementation of the feature. Thus, the execution routine may be prepared for a CPU that executes only one machine language instruction during one cycle. Here is shown an execution routine performed by the above described PowerPC 603e in order to implement processing performed at a higher speed.

Figure 18:
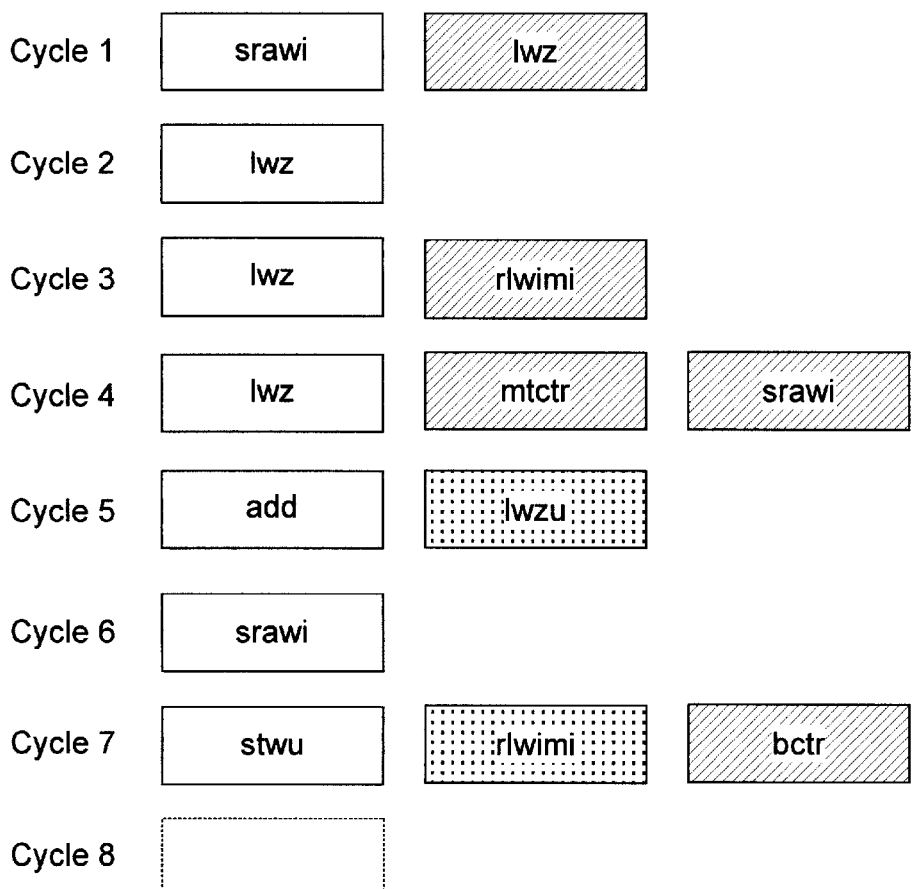
FIG. 18 is a diagram showing an example execution routine for rule "ILLADDS"

FIG. 18 shows an execution routine for rule "ILLADDS" using a byte code sequence of "iload", "iload", "iadd" and "istore." The left column represents the original rule process, and "srawi" is an instruction for calculating an offset for data 2. The first "lwz" is an instruction for loading data 1 from a local variable; the second "lwz" is an instruction for loading data 2 from a local variable; and the third "lwz2" is an instruction for loading an operand for "istore." The "add" is an instruction for adding data 1 to data 2; the succeeding "srawi" is an instruction for calculating an offset at a destination at which the results are stored; and the "stwu" is an instruction for storing the results in a local variable.

The center and the right columns in FIG. 18 represent, respectively, part (shaded portion) of the instructions for jumping to the next intermediate code and part (hatched portion) of the instructions for jumping to the next plus one intermediate code. The part of the instructions for jumping to the next intermediate code differs from that shown in FIGS. 6 to 8. That is, the instruction "lwz" for fetching the next intermediate code and the instruction "rlwimi" for calculating the address of the following execution routine are additionally provided. This is based on the following. In the execution routine for the intermediate code before "ILLADDS," a part of the instructions for jumping to the intermediate code after the next intermediate code, i.e., the prefetching of the intermediate code after the next intermediate code and the address calculation of the execution routine, is performed. According to the second feature of the present invention, the intermediate code that corresponds to the byte code included in the definition for "ILLADDS" is also generated. Therefore, the intermediate code that comes after the next intermediate code preceding the "ILLADDS" is second byte code "iload," which is included in the definition for "ILLADDS." Since this is theoretically incorrect, re-calculation is performed in the execution routine for "ILLADDS." The remaining portion of the processing is the same as previously described.

The details for the rule "ILLADDS" that includes "iload 4", "iload 5", "iadd" and "istore 6" are as follows:

cycle # 1
srawi r4,now,14
lwz now,12(pc)
cycle # 2
lwz r3,bp,op
cycle # 3
lwz r4,bp, r4
rlwimi ea,now,2,16,29
cycle # 4
mtctr ea
lwz r5,8(pc)
srawi op,now,14
cycle # 5
lwzu now,16(pc)
add r3,r3,r4
cycle # 6
srawi r5,r5,14
cycle # 7
stwu r3,bp,r5
rlwimi ea,now,2,16,29
bctr
cycle # 8
pipeline stall The present invention has been described as the processing performed by a JIT compiler. A module/circuit for functions that correspond to the individual steps in the flowcharts can be prepared to constitute a dedicated apparatus.

When a program is used to implement the JIT compiler, it may be stored on a storage medium, such as a CD-ROM, an MO or a floppy disk. The program as well as byte code may be loaded into or stored in a client computer across a network.

The above described embodiment is merely an example, and the execution routine can be modified for a CPU other than a PowerPC. Further, the processing performed for the second feature of the invention is not limited to that shown in FIG. 11, and other processing can be performed in order to generate the intermediate code in the center and the right columns in FIG. 10. The algorithms used in FIGS. 12, 13 and 14 can be replaced with others.

To summarize, the present invention provides a compiler that can execute Java byte code at high speed while employing only limited resources. The compiler can also perform rule-based optimization without analyzing program structure. Further, the present invention permits a rule to be applied, regardless of the basic block boundaries of a program, in order to optimize the execution of the program. Also, the present invention provides an instruction configuration that fully utilizes the capabilities of a CPU for an execution routine corresponding to a byte code.

A processing example for when the interpreter method or the threaded code method is employed by the PowerPC will be explained. FIG. 19 shows the processing using the interpreter method. Process (a) shows a decoding loop, and process (b) shows the execution routine for "iload". As apparent from FIG. 19, the processes (a) and (b) must be performed to execute "iload", and a total of 17 cycles is required. To perform the same process as in the above described "ILLADDS", example, the processes (a), (b), (a), (b), (a), (c), (a) and (d) are required. Process (c) is an execution routine for "iadd", while process (d) is an execution routine for "istore". Since rule-based optimization is not performed with the interpreter method, multiple cycles are required, and accordingly, the processing is slow.

FIG. 20 shows the process using the threaded code method. According to this method, first, the intermediate code is executed, and then the execution routine is initiated. The "iload" process is shown in FIG. 20(a), and in the intermediate code processing, a local variable index is set and a call for the execution routine is made. FIG. 20(b) shows the "ILLADDS" process, where the intermediate code process is performed, and then an execution routine is processed. When compared with the processes in FIGS. 8 and 18, it can be seen that almost the same number of cycles is required; however, when rule-based optimization is to be performed using the threaded code method, the program structure must be analyzed first, so that the processing of the present invention is performed faster. In addition, since, in the threaded code system, the intermediate code is also an instruction, the instruction cache is used for this code. On the other hand, since in the present invention the intermediate code is data, the processing speed can be increased from the viewpoint of the efficient employment of the instruction cache. Furthermore, the size of the intermediate code is smaller than the threaded code.

What is claimed:

1. A method for generating, from a first data sequence, a second data sequence, comprising the steps of:

reading a first data sequence;

determining whether the read first data sequence is identical to one of a plurality of predetermined rule sequences, each of the predetermined rule sequences comprising a set of data containable in the first data sequence; and if the read first data sequence is identical to one of the rule sequences, converting a first data component in the read first data sequence to a second data type corresponding to the one of the rule sequences;

determining whether there is a probability that a data sequence other than the first read data sequence is identical to a data sequence included in said predetermined rule sequences; and if it is ascertained that there is no probability, converting data next to said first read data sequence into a second kind of corresponding data.

2. The method according to claim 1, further comprising the step of:

if the read first data sequence is identical to one of the rule sequences, converting any remaining data components in the read first data sequence into a second kind of corresponding data.

3. The method according to claim 1, further comprising the step of:

performing said probability determining step for a data sequence in said first kind of read data sequence, said data sequence being not yet converted into the second kind of data sequence.

4. The method according to claim 1, wherein a structure of the first data sequence is not analyzed before said determining step.

5. The method according to claim 1, further comprising the steps of:

determining whether the data sequence in the read first data sequence that is not yet converted into the second kind of data is identical to said predetermined rule sequence if it is ascertained that there is a probability; and if said data sequence is identical to said predetermined rule, converting the first data of said data sequence in said first kind of read data sequence, said data sequence not yet converted into the second kind of data, into the second kind of data corresponding to said predetermined rule sequence that is determined to be identical.

6. The method according to claim 1, wherein said converting step further comprises calculating an address for an execution routine corresponding to the first data component.

7. A method for converting a byte code sequence into an intermediate code sequence, comprising the steps of:

reading a byte code sequence;

determining whether the read byte code sequence is identical to one of a plurality of predetermined rule sequences, each of the said predetermined rule sequences comprising a byte code sequence which may be contained in the read byte code sequence; and if the read byte code sequence is identical to one of the rule sequences, converting a first code portion of said read byte code sequence to intermediate code which corresponds to the one of the rule sequences.

8. The method according to claim 7, further comprising the steps of:

determining whether there is a probability that an additional byte code sequence other than the first code portion in said byte code sequence is identical to one of the rule sequences; and if it is ascertained that there is no probability, converting a code following the first code portion into corresponding intermediate code.

9. Computer readable code stored on media and comprising a plurality of execution routines executable by a processor that can execute two or more instructions in one cycle, each of said plurality of execution routines including:

instructions originally required for an execution routine;

part of instructions for jumping to a second execution routine that is executed following the execution routine; and part of instructions for jumping to a third execution routine that is executed following the second execution routine, wherein each of said execution routines corresponds to each code in a code sequence that regulates the processing flow; wherein said part of instructions for jumping to said second execution routine includes an operand generation instruction for said second execution routine and a jump instruction for jumping to said second execution routine; and wherein said part of instructions for jumping to said third execution routine includes an instruction for fetching a code corresponding to said third execution routine, and an instruction for calculating an address of said third execution routine.

10. Computer readable code according to claim 9, wherein each of said execution routines corresponds to each code in a code sequence that regulates the processing flow; and wherein a rule execution routine, which is a set of a plurality of execution routines, includes an instruction for fetching a code corresponding to said second execution routine from said code sequence, an instruction for calculating an address of said second execution routine, an operand generation instruction for said second execution routine, an instruction for jumping to said second execution routine, an instruction for fetching a code corresponding to said third execution routine from said code sequence, and an instruction for calculating an address of said third execution routine.

11. In a computing environment, a system for generating from a first kind of data sequence, a second kind of data sequence, comprising:

a module for reading a first kind of data sequence;

a module for determining whether the read first kind of data sequence is identical to one of predetermined idiom rules, each said predetermined idiom rules comprising a set of the first kind of data; and a conversion module for converting the first data in said first kind of read data sequence to a second kind of data corresponding to said one of the idiom rules, if said first kind of read data sequence is identical to said one of the idiom rules, wherein said conversion module includes a module for calculating an address of an execution routine that corresponds to said first kind of data.

12. The system according to claim 11, further comprising:

a second determination module for determining whether there is a probability that a data sequence other than said first data in said first kind of read data sequence is identical to a data sequence included in said predetermined idiom rule, wherein if it is ascertained that there is no probability, said conversion module converts data next to said first data into said second kind of corresponding data.

13. The system according to claim 11, wherein said execution routines are executed by a processor that can execute two or more instructions during one cycle; wherein said system further comprises a storage device for storing said execution routines; wherein each of said execution routines includes:

instructions originally required for an execution routine;

part of instructions for jumping to a second execution routine that is performed following said execution routine; and part of instructions for jumping to a third execution routine that is performed following said second execution routine.

14. A system for converting a byte code sequence into an intermediate code sequence, comprising:

a processor;

a memory;

a program to be executed by a processor, said program including:

a module for reading a byte code sequence;

a module for determining whether the read byte code sequence is identical to one of a plurality of rule code sequences each of the plurality of rule code sequences comprising a set of byte codes; and a conversion module for converting a first code portion of said read byte code sequence to an intermediate code corresponding to the identical rule code sequence, if said determining module determines the read byte code sequence is identical to one of the rule code sequences.

15. The system according to claim 14, wherein said memory stores execution routines that correspond to individual byte code portions, and wherein said conversion module performs a process for calculating an address of an execution routine corresponding to said byte code.

16. The system according to claim 15, wherein said processor executes a plurality of instructions in one cycle; wherein an execution routine that corresponds to said rule code sequence includes an instruction for fetching a first intermediate code to be executed next to said rule code sequence, said first intermediate code corresponding to a second execution routine, an instruction for calculating an address of said second execution routine, an operand generation instruction for said second execution routine, an instruction for jumping to said second execution routine, an instruction for fetching a second intermediate code to be executed next and next to said rule code sequence, said second intermediate code corresponding to a third execution routine, and an instruction for calculating an address of said third execution routine.

17. A computer program stored on storage medium for causing a computer to generate from a first kind of data sequence, a second kind of data sequence, said program comprising the steps of:

reading a first kind of data;

determining whether the first kind of read data sequence is identical to one of a plurality of predetermined rule data, each said predetermined rule data comprising a set of said first kind of data;

converting the first data in said first kind of read data sequence to a second kind of data corresponding to said predetermined rule data, if said first kind of read data sequence is identical to said one of the predetermined rule data; and calculating an address of an execution routine that corresponds to said first kind of data.

18. A computer program for causing a computer to convert a byte code sequence into an intermediate code sequence, said program comprising the steps of:

reading a byte code sequence;

determining whether the read byte code sequence is identical to one of a plurality of predetermined idiom code sequences, each said predetermined idiom code sequence comprising a set of said byte codes; and converting the first byte code of said read byte code sequence to an intermediate code associated with an identical one of the idiom code sequences, if said read byte code sequence is identical to one of the idiom code sequences.

* * * * *